Oct. 15, 1963    G. R. MORRIS ETAL    3,106,996
TRANSMISSION SHIFT CONTROLLING MECHANISM
Filed July 3, 1961    4 Sheets-Sheet 3
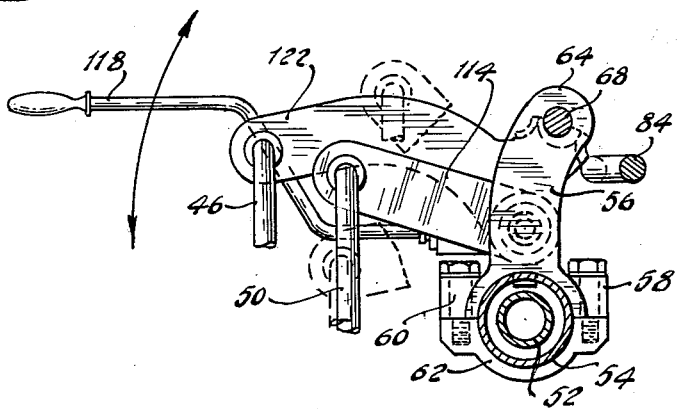
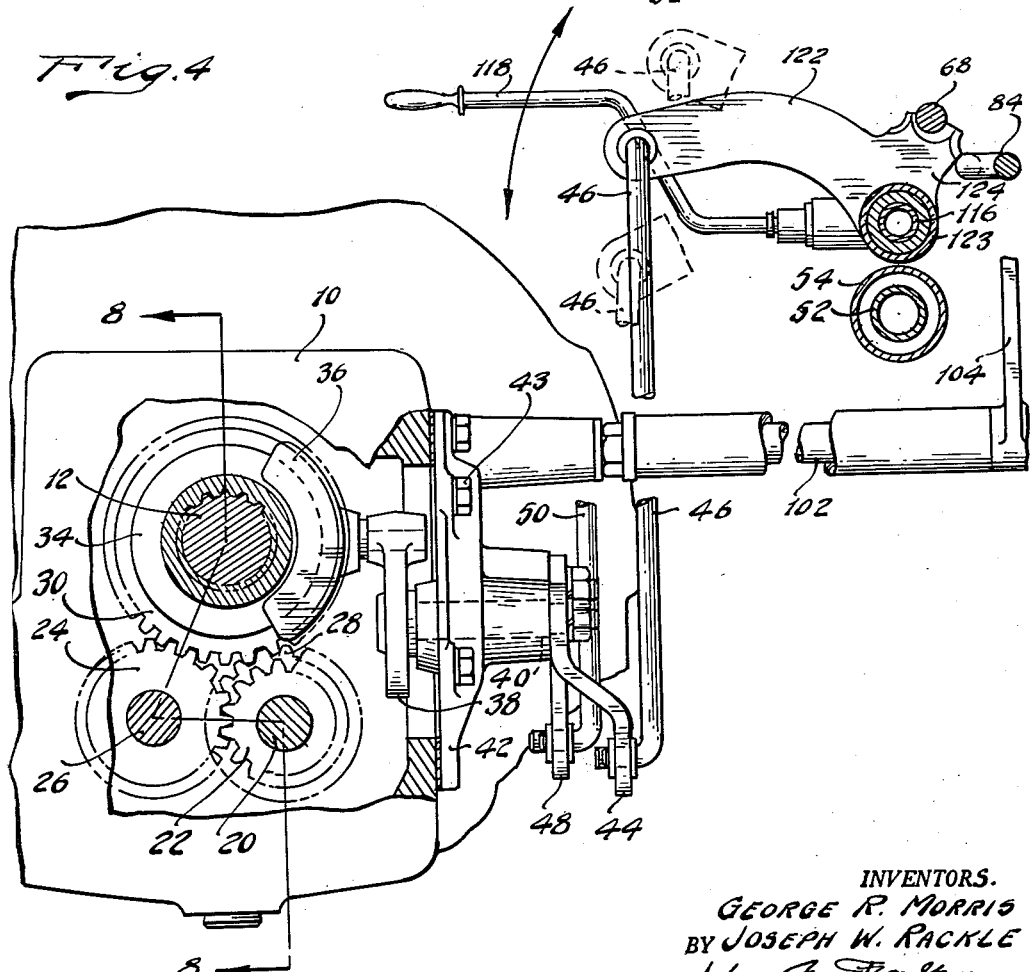
INVENTORS.
GEORGE R. MORRIS
BY JOSEPH W. RACKLE
John A. Faulkner
and Daniel J. Harrington
ATTORNEYS

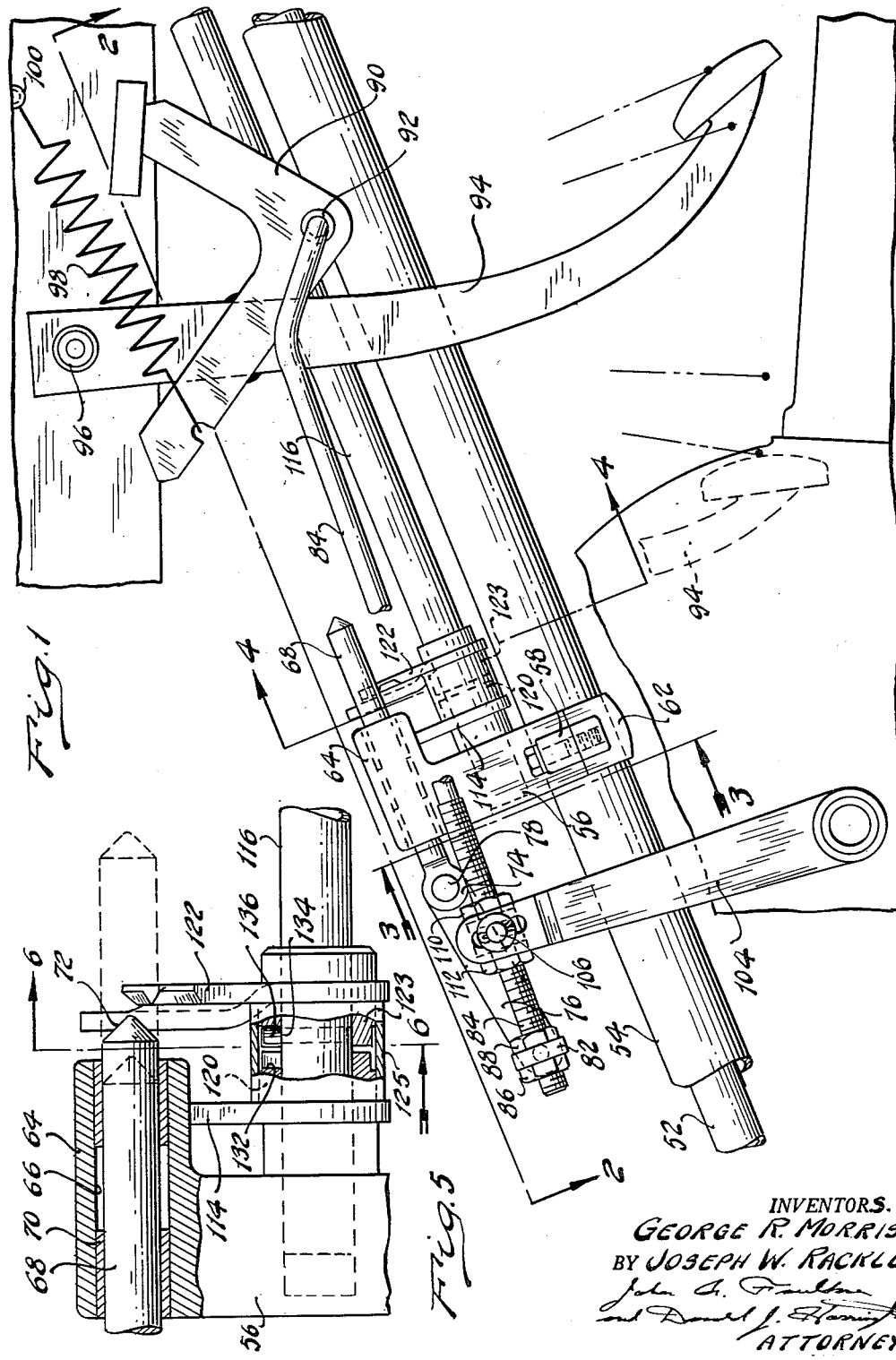

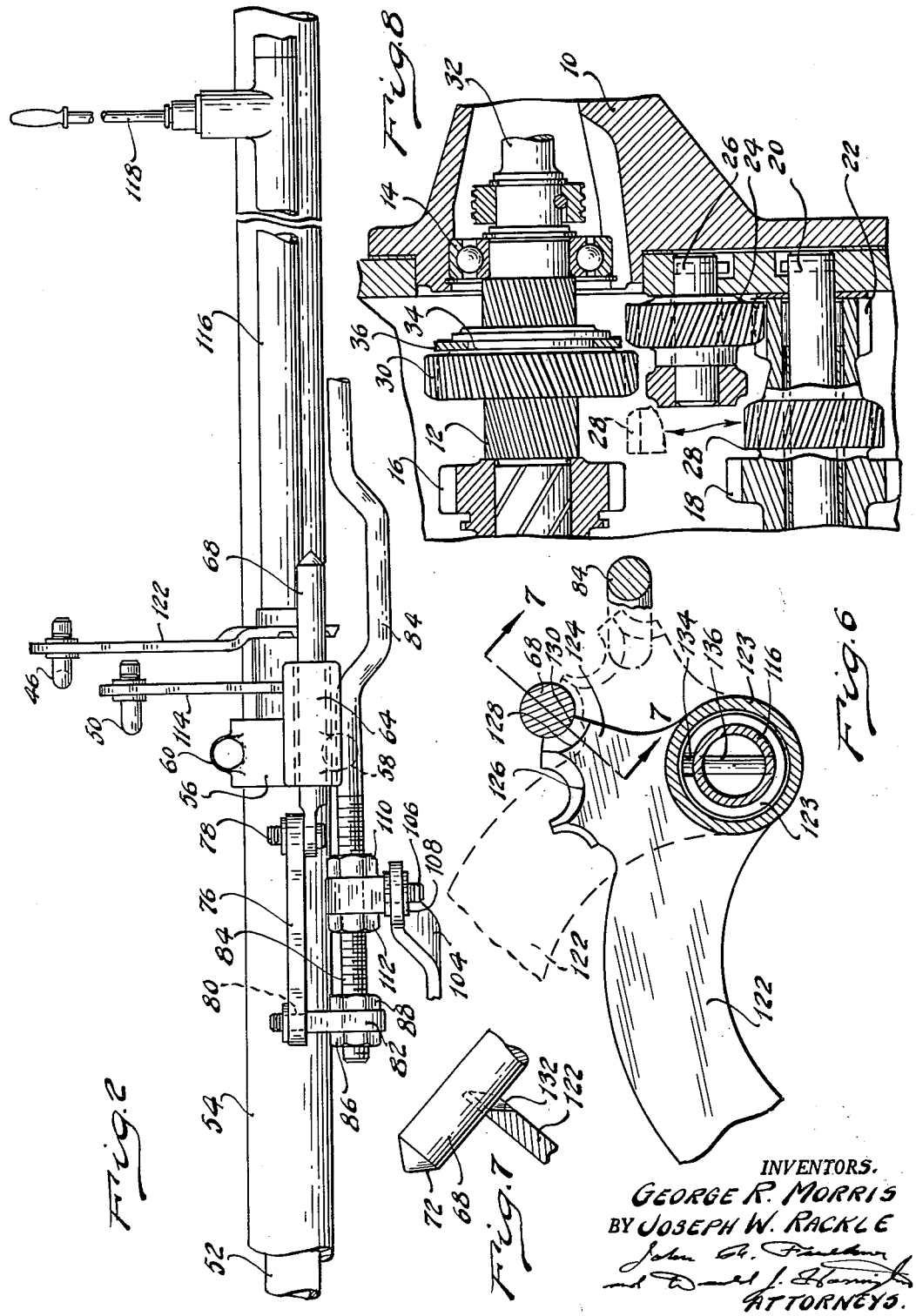

3,106,996
TRANSMISSION SHIFT CONTROLLING MECHANISM
George R. Morris, Monroe, and Joseph W. Rackle, Detroit, Mich., assignors to Ford Motor Company, Dearborn, Mich., a corporation of Delaware
Filed July 3, 1961, Ser. No. 121,466
2 Claims. (Cl. 192—3.5)

Our invention relates generally to geared power transmission mechanisms, and more particularly to a new and improved means for controlling speed ratio shifts in such a mechanism.

Our invention is adapted especially for use with an automotive vehicle transmission mechanism having manually controlled gear elements that define plural torque delivery paths between the power input shaft and the power output shaft. It is particularly useful with automotive vehicle transmission mechanisms that employ a cluster gear assembly situated for rotation about a countershaft arranged in parallel relationship with respect to a main shaft.

The cluster gear assembly for such mechanisms has several gear elements that engage individually a power input gear and an intermediate speed gear arranged for rotation about the axis of the main shaft. The power input gear is connected drivably to the power input shaft and the intermediate speed gear is journaled rotatably on the main shaft. Synchronizer clutch structure is provided for selectively connecting the main shaft to the intermediate speed gear or the power input gear to establish either an intermediate speed ratio or direct drive.

In addition, the main shaft has carried slidably thereon a low and reverse speed gear. Relative rotation between the main shaft and the low and reverse gear is inhibited although it can be moved axially in either direction. Upon movement in one direction, the low and reverse gear engages a corresponding low speed gear element of the cluster gear assembly thus establishing a low speed driving ratio. If reverse drive is desired, the sliding gear can be moved in the opposite direction into meshing engagement with the reverse idler pinion, the latter drivably engaging a corresponding reverse drive gear element on the cluster gear assembly. Reverse drive is established in this fashion. The power output shaft is connected to the main shaft and the power input shaft is connected to the engine through a neutral clutch that is under the control of the vehicle operator.

In shifting from one ratio to another, the operator must disengage the clutch in order to relieve the driving torque on the gear elements of the assembly. When the clutches are in a disengaged position, various speed ratio changes can be accomplished by positioning appropriately the synchronizer clutch structure or by moving the low and reverse gear.

A shifter fork is employed for moving the low and reverse gear and a separate shifter fork is provided for moving the synchronizer clutch structure. These shifter forks are also under the control of the vehicle operator, a suitable shift linkage being provided for this purpose.

It is possible in a mechanism of the type described in the foregoing paragraphs to move the low and reverse gear from a neutral position to either the low speed drive position or the reverse drive position in such a way that it is only in partial engagement. This movement occurs, of course, when the neutral clutch is disengaged as previously explained. When the neutral clutch again is engaged by the vehicle operator, a reverse driving torque must be delivered through the gear and the cooperating gear element of the cluster gear assembly. If the gear is engaged only partially, the gear tooth stresses become extreme and failure often results.

It has been found also that a tendency exists for the low and reverse gear to move from the low speed drive position toward a neutral position when the vehicle is coasting under closed throttle conditions. This normally is called engine braking. Under these circumstances the thrust acting on the low and reverse gear tends to shift the gear out of engagement with the cooperating low speed drive portion of the cluster gear assembly. This reverse thrust is obtained by reason of the helix angle that is provided normally on the low and reverse gear and the cooperating cluster gear assembly. This condition is undesirable from a safety standpoint and it also tends to cause premature gear failure.

The improvement of our instant invention overcomes both of the disadvantages described in the foregoing paragraphs. It does this by forming an interlock for the neutral clutch and the gear shift linkage mechanism. The mechanism of this interlock is actuated by the neutral clutch and it functions to index appropriately the gear shift linkage mechanism to any one of three defined positions, namely, a low speed drive position, a reverse drive position or a neutral position. This eliminates the possibility that the gear shift mechanism will assume any position intermediate the neutral position and the low speed position or between the neutral position and the reverse drive position. Once one of the three positions has been assumed, our improved linkage mechanism is inhibited from being moved inadvertently out of position or from being moved under the influence of reverse driving torque acting on the low and reverse gear under engine braking conditions.

The neutral clutch structure releasably connects the vehicle engine and the transmission power input shaft. It includes a foot pedal that is accessible to the vehicle operator. This pedal normally can be moved with a degree of travel that is greater than that required to engage and disengage the clutch mechanism. If it is assumed that the clutch pedal is depressed sufficiently to disengage the clutch structure and relieve the transmision gear elements of driving torque, a sufficient degree of reserve movement of the clutch pedal can be obtained. It is when the clutch pedal operates within this reserve area that the interlock mechanism becomes released to permit actuation of the gear shift linkage mechanism. Conversely, when the clutch pedal is moved toward a clutch engaging position the indexing action previously described takes place while the clutch pedal is traveling in the reserve area. It thus is possible to position appropriately the gear shift linkage to the desired operating position before torque is applied to the driving gear elements of the mechanism.

The provision of a transmission control mechanism of the type above set forth being a principal object of our invention, it is a further object of our invention to provide an interlock for a geared power transmission mechanism wherein provision is made for maintaining the gears in continuous meshing engagement under all operating conditions for each driving speed ratio.

It is another object of our invention to provide a manually controlled power transmission mechanism having a driver operated member for adjustably positioning a shifted gear element during a speed ratio change from an inoperative position to a torque delivery position wherein provision is made for preventing application of torque to the gear elements when the driver operated member is displaced from a position corresponding to the torque delivery position of the shifted gear element.

It is another object of our invention to provide a power transmission mechanism having an operator controlled gear element wherein provision is made for preventing transfer of torque through the transmission when the gear elements are only partially in engagement.

It is a further object of our invention to provide a gear mechanism having personally controlled torque delivery elements and a personally operable clutch for transmitting torque to the power input element of the mechanism wherein an interlock is provided for inhibiting movement of the controlling elements when the clutch is engaged.

It is a further object of our invention to provide an interlock of the type set forth in the foregoing paragraph wherein portions thereof are connected operatively to the clutch.

It is a further object of our invention to provide a mechanism of the type set forth in the preceding paragraphs wherein the interlock is capable of indexing the controlling element upon engagement of the clutch when the gear controlling member assumes a position intermediate the torque delivery position and an inoperative position.

Further objects and advantages of our invention will become apparent from the following particular description of our invention and from the accompanying drawings wherein:

FIGURE 1 shows a portion of a transmission gear shift and the steering column assembly for an automotive vehicle;

FIGURE 2 is a partial plan view of a steering column and gear shift assembly showing portions of the gear shift linkage mechanism for an automotive vehicle;

FIGURE 3 is a partial cross sectional view of the assembly of FIGURE 1 taken along section line 3—3 of FIGURE 1;

FIGURE 4 is another partial cross sectional view of the assembly of FIGURE 1 taken along section line 4—4 of FIGURE 1;

FIGURE 5 is a partial cross sectional view of a portion of the interlock mechanism;

FIGURE 6 is a transverse cross sectional view of the mechanism of FIGURE 5 taken along section line 6—6 of FIGURE 5;

FIGURE 7 is a detailed view of a portion of the structure of FIGURES 5 and 6;

FIGURE 8 is a cross sectional view of a portion of a power transmission mechanism and is taken along section line 8—8 of FIGURE 4.

Figure 9:
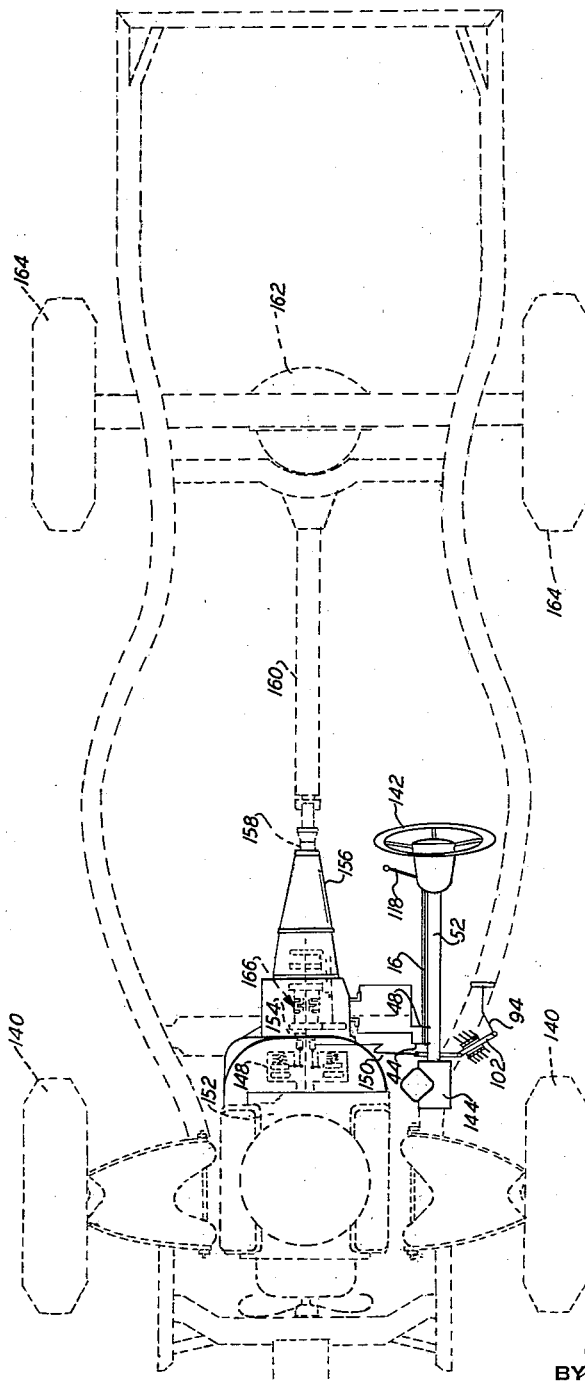
FIGURE 9 shows in schematic form a vehicle chassis and vehicle control elements which embody features of our invention.

Referring first to FIGURES 4 and 8, numeral 10 designates a transmission housing and numeral 12 designates a transmission main shaft journaled at one end within the housing 10 by means of bearings 14. An intermediate speed gear is shown at 16 and it is journaled rotatably on shaft 12. Although relative axial movement between gear 16 and shaft 12 is inhibited, gear 16 engages a gear element 18 formed on the cluster gear assembly that is journaled for rotation about an axis parallel to the axis of shaft 12. A countershaft 20 is employed for journaling the cluster gear assembly and it in turn is supported by the transmission casing 10. The countershaft 20 is shown out of position for purposes of clarity although it will be recognized that gear 16 is engaged driveably with gear element 18 during operation.

The cluster gear assembly includes a reverse gear element 22 that is in continuous engagement with a reverse idler pinion 24 journaled by a shaft 26. The transmission casing 10 supports shaft 26.

The cluster gear assembly includes also a low speed gear element 28 and it is adapted to engage normally a sliding gear 30 supported by the shaft 12. Spirally disposed spline teeth are formed on the shaft 12 to accommodate an axial sliding movement of the sliding gear 30 although rotary motion between the shaft 12 and gear 30 is inhibited. When the gear 30 is moved in a left-hand direction as viewed in FIGURE 8, it drivably engages gear element 28 thus establishing a driving connection between the cluster gear assembly and the shaft 12. As previously indicated, shaft 12 is connected to the power output shaft. This is shown at 32.

The low and reverse gear is formed with a groove 34 within which is received the fingers of a shifter fork that is best seen in FIGURE 4 at 36. This fork is pivoted to the end of an arm 38 that in turn is connected to a shaft 40 extending outwardly of a cover plate 42. This plate is connected to the transmission casing 10 by suitable bolts 43. A shift lever 44 is connected to the outward end of the shaft 40, and one end thereof is connected to a rod 46.

Another shift lever is shown at 48 and it in turn is connected operatively to another shifter fork, not shown, which actuates the above-described synchronizer clutch structure for selectively engaging and disengaging the gear 16 from the shaft 12 and for connecting the shaft 12 to the power input shaft. This lever in turn is connected to a shift rod 50.

Referring next to FIGURES 1 and 2, numeral 52 designates a vehicle steering shaft that is connected to the steering linkage of the dirigible wheels for the vehicle. Surrounding this shaft is a fixed sleeve shaft 54 that defines the portion of the vehicle chassis normally referred to as the steering column.

Connected to the shaft 54 is a bracket 56 having a yoke portion that defines shoulders 58 and 60 as best seen in FIGURE 3. A strap or clamping element 62 is disposed about shaft 54 and it can be clamped to the shoulders 58 and 60 by suitable clamping bolts thereby retaining the bracket 56 in a relatively fixed position.

An outer portion of the bracket 56 defines a cylindrical piece 64 having a bore 66 and having an axis extending in the direction of the steering column. A plunger 68 is received within the bore 66 and is retained slidably therein by suitable bushings 70.

By preference, the plunger 68 is cylindrical in form and it is formed with a conical nose 72 at one end thereof as indicated. The other end of the plunger 68 defines an eyelet 74. This accommodates a pivotal connection with a link 76, a suitable pivot pin 78 being provided for this purpose. The other end of the link 76 is connected to a pivot pin 80 that is carried by a washer 82. A threaded rod 84 is received through the washer 82 as best seen in FIGURES 1 and 2. The washer 82 can be positioned axially on the rod 84 and fixed in any position by lock nuts 86 and 88.

The rod 84 is connected operatively to a clutch lever element 90 as best seen in FIGURE 1. The end of rod 84 forms a pivotal connection with the element 90 as shown at 92. Lever element 90 is connected to clutch lever 94 that defines a clutch pedal accessible to the vehicle operator. Lever 94 is pivoted to a stationary portion of the chassis as shown at 96. A clutch return spring 98 acts between a fixed pin 100 on the vehicle chassis and an extended end of the element 90 thus normally urging the lever 94 in a counterclockwise direction as viewed in FIGURE 1.

A clutch equalizer lever is shown in FIGURE 4 at 102 and it in turn is connected operatively to the aforementioned neutral clutch structure for engaging and disengaging the same. This clutch structure is not illustrated in the drawings. A lever 104 is fixed to the lever 102 and is adapted to oscillate about the axis of lever 102. The free end of the lever 104 is apertured and receives a pivot pin 106 that is carried by a washer 108. The rod 84 is received through the washer 108 and lock nuts 110 and 112 are provided for retaining the washer 108 in the desired adjusted position on the rod 84.

The aforementioned rod 50 is connected to a lever 114 pivoted for oscillation about the axis of a gear shift column 116. One end of the column 116 is joined to the intermediate portion of a gear shift lever that can be operated by the vehicle operator. One end of the lever 118 can be anchored in a conventional fashion to the relatively stationary sleeve of the steering column. The shift column 116 can be shifted in an axial direction or it can be rotated by the lever in known fashion.

The lever 114 is formed with a hub 120 through which the column 116 extends.

The rod 46 is connected operatively to a lever 122 that is formed with a hub as shown at 123. The hubs 120 and 123 for the levers 114 and 122, respectively, are situated in juxtaposed relationship and they are each mounted on column 116 that is received therethrough. A sleeve 125 surrounds hubs 120 and 123. An interlock plate 124 is carried by the lever 122 as best seen in FIGURE 6. It is formed with three recesses 126, 128 and 130. These recesses are situated in angularly spaced relationship about the axis of shift column 116. The recesses 126, 128 and 130 are formed with cammed surfaces that cooperate with the coned end 72 of the plunger 86. During operation, one of the three recesses is situated in the line of movement of the plunger 68.

A recess 132 is formed in the hub 120 as shown in FIGURE 5 and a corresponding recess 134 is formed in the hub 123. These recesses are situated in adjacent relationship and are aligned axially when the transmission mechanism assumes a neutral condition. A selector pin 136 is carried by shift column 116 and is adapted to engage one or the other of recesses 132 or 134. When the column 116 is shifted in the right-hand direction as viewed in FIGURE 5, pin 136 engages recess 134. Upon subsequent rotation of the column 116 by the lever 118, the lever 122 rotates about its axis thereby positioning appropriately the shift lever 44 and the low and reverse sliding gear 30.

In a similar fashion, if the column 116 is shifted axially in a left-hand direction as viewed in FIGURE 5, the pin 136 engages recess 132 and subsequent rotation of the column 116 will cause an oscillating motion of the lever 114 to position appropriately the aforedescribed synchronizer clutch structure and condition the transmission for either intermediate speed ratio or direct drive operation. It will be observed, however, that the lever 122 cannot be oscillated about its axis unless the plunger 68 is withdrawn to the full line position shown in FIGURE 5. This is accomplished when the clutch lever 94 has been moved to the clutch disengaging position.

The dotted right-hand position of the plunger 68 shown in FIGURE 5 represents one extreme position that is assumed when the clutch is disengaged fully. It can travel, however, from this extreme right-hand position to the full line position shown in FIGURE 5 while the clutch mechanism is in its reserve position. Further movement of the clutch lever toward the clutch applying position will, however, cause engagement of the clutch. Before the clutch is engaged, the coned nose 72 of the plunger 68 will cause the lever 122 to become indexed to one of the three positions that are defined by the recesses 126, 128 or 130.

During the time that the clutch structure is in its reverse position the lever 122 is adjusted to a low speed position. The plunger 68 then will lock the lever 122 in the low speed position after the clutch lever 94 has been released to the clutch engaging position. Thereafter the low and reverse gear will be locked in its low speed position regardless of the direction of the thrust forces that are acting on it. It can be moved out of the low speed position only after the clutch lever again has assumed a clutch released position.

In the particular embodiment disclosed, the recess 126 corresponds to the low speed position. If this recess is misaligned to any degree after the operator has shifted the column 116 to the low speed position, the plunger 68 will engage the tapered surface of the recess 126 to index the lever 122 to the low reverse position. This prevents partial engagement of the low speed gear. In a similar fashion, the plunger 68 will index appropriately the lever 122 after the shift column has been moved toward a reverse drive position. Any misalignment of the recess 130 with respect to the line of action of the plunger 68 will be corrected thus preventing partial engagement of the reverse drive gear elements.

Referring next to FIGURE 7, the tapered cam surface for the recess 128 can best be seen. This is designated by reference character 132. It will cooperate with the coned surface of the nose of plunger 68 to index appropriately the lever 122 either one way or the other if misalignment occurs. It can be observed by referring to FIGURES 6 and 7, however, that the corresponding cam surfaces for the recesses 126, 128 and 130 blend together so that the nose of the plunger 68 necessarily will engage one of the cammed surfaces regardless of the relative position of the lever 122 with respect to the plunger 68. This eliminates the possibility that the retracting movement of the plunger 68 will be inhibited by any abutting portion of the plate 124 carried by the lever 122. The clutch return springs thus will be effective in engaging the clutch structure whenever the vehicle operator relieves foot pressure from the clutch lever 94. This would be true regardless of the position of the column 116 and regardless of whether the plunger 68 is misaligned with respect to the recesses 126, 128 or 130.

Referring next to FIGURE 9, the dirigible wheels for the vehicle are shown at 140. The steering shaft 52 supports a driver controllable steering wheel 142, and a suitable steering linkage mechanism shown in part at 144 is employed for mechanically connecting the wheels 140 to the shaft 52.

The driver controlled clutch pedal 94 is connected mechanically to a friction neutral clutch 148. This connection is established by a lever 102 and a suitable clutch operating linkage shown schematically at 150. This establishes and interrupts a driving connection between the vehicle engine 152 and a power input shaft 154 for the transmission mechanism, the latter being generally indicated by reference character 156. The transmission driven shaft 158 is connected to a drive shaft 160. A differential gear mechanism 162 in turn connects shaft 160 to the traction wheels 164.

The gear elements have been designated generally in FIGURE 9 at 166. These include the gear elements shown in more detail in FIGURE 8 and they are capable of establishing a geared connection between the driven element of the clutch 148 and the shaft 158. The relative motion of the gear elements, of course, is controlled by shifter forks, one of which is shown in FIGURES 4 and 8 by means of reference character 36.

Having thus described a preferred form of our invention, what we claim and desire to secure by United States Letters Patent is:

1. In a motor vehicle having dirigible wheels, a power transmission mechanism capable of delivering torque from a vehicle engine to a driven shaft, a steering column, a personally operable dirigible wheel steering shaft supported by said column, a power input shaft, gears drivably connecting said shafts, means for controlling the relative motion of said gears to establish a torque delivery path, a clutch lever adapted to be connected to a selectively engageable clutch means for connecting said engine and said power input shaft, a gear controlling element comprising a gear controlling shaft supported by said column and movable from one angular position to another about the axis of said gear controlling shaft to condition said transmission mechanism for operation in either of two selected driving ratios, an interlock element, supported by said column and connected to said clutch lever, said interlocking element being movable axially in the direction of the axis of said column into the path of movement of said gear controlling element when said clutch lever is moved toward a clutch engaging position thereby inhibiting movement of said gear controlling element, said gear controlling element comprising a shift lever element, a recess formed in said shift lever element, said interlock member being in the form of a plunger, and a tapered nose formed in the plunger, said nose being adapted to be received within said recess when said clutch lever assumes said clutch engaging position.

2. In a motor vehicle having dirigible wheels, a power transmission mechanism capable of delivering torque from a vehicle engine to a driven shaft, a steering column, a personally operable dirigible wheel steering shaft supported by said column, a power input shaft, gears drivably connecting said shafts, means for controlling the relative motion of said gears to establish a torque delivery path, a clutch lever adapted to be connected to a selectively engageable clutch means for connecting said engine and said power input shaft, a gear controlling element comprising a gear controlling shaft supported by said column and movable from one angular position to another about the axis of said gear controlling shaft to condition said transmission mechanism for operation in either of two selected driving ratios, an interlock element supported by said column and connected to said clutch lever, said interlocking element being movable axially in the direction of the axis of said column into the path of movement of said gear controlling element when said clutch lever is moved toward a clutch engaging position thereby inhibiting movement of said gear controlling element, said gear controlling element comprising a shift lever element, a recess formed in said shift lever element, said interlock element being in the form of a plunger, and a tapered nose formed on the plunger, said nose being adapted to be received within said recess when said clutch lever assumes said clutch engaging position, the margin of said recess being tapered to define a surface that cooperates with the conical surface of said nose thus causing said gear controlling element to be indexed to a position corresponding to that position in which said plunger and said recess are aligned.

References Cited in the file of this patent

UNITED STATES PATENTS

| | | |
|---|---|---|
| 1,331,759 | Gustofson | Feb. 24, 1920 |
| 1,497,569 | Klausmeyer | June 10, 1924 |
| 1,564,719 | Sponable | Dec. 8, 1925 |
| 2,177,209 | Elliott | Oct. 24, 1939 |
| 2,847,871 | Schick | Aug. 19, 1958 |
| 2,969,690 | Ivan | Jan. 31, 1961 |

FOREIGN PATENTS

| | | |
|---|---|---|
| 1,053,325 | Germany | Mar. 19, 1959 |